(12) United States Patent
Meau et al.

(10) Patent No.: US 10,789,307 B2
(45) Date of Patent: Sep. 29, 2020

(54) CLOUD-BASED DISCOVERY AND INVENTORY

(71) Applicant: BDNA Corporation, Mountain View, CA (US)

(72) Inventors: Alexander Meau, Mountain View, CA (US); Prakhar Gangwal, Mountain View, CA (US); Robin James, Mountain View, CA (US)

(73) Assignee: BDNA Corporation, Itasca, IL (US)

( * ) Notice: Subject to any disclaimer, the term of this patent is extended or adjusted under 35 U.S.C. 154(b) by 237 days.

(21) Appl. No.: 15/706,500

(22) Filed: Sep. 15, 2017

(65) Prior Publication Data

US 2019/0042649 A1    Feb. 7, 2019

Related U.S. Application Data

(60) Provisional application No. 62/539,726, filed on Aug. 1, 2017.

(51) Int. Cl.

| | |
|---|---|
| *G06F 16/951* | (2019.01) |
| *G06F 16/908* | (2019.01) |
| *G06F 16/955* | (2019.01) |
| *H04L 29/08* | (2006.01) |
| *G06F 16/957* | (2019.01) |
| *G06F 16/2457* | (2019.01) |

(52) U.S. Cl.
CPC ...... *G06F 16/951* (2019.01); *G06F 16/24573* (2019.01); *G06F 16/908* (2019.01); *G06F 16/955* (2019.01); *G06F 16/9574* (2019.01); *H04L 67/02* (2013.01); *H04L 67/16* (2013.01); *H04L 67/20* (2013.01); *H04L 67/10* (2013.01)

(58) Field of Classification Search
CPC ............. G06F 16/951; G06F 16/24573; G06F 16/9574; H04L 67/02
See application file for complete search history.

(56) References Cited

U.S. PATENT DOCUMENTS

| | | | |
|---|---|---|---|
| 2007/0198609 A1* | 8/2007 | Black | G06Q 10/087 |
| 2010/0242028 A1* | 9/2010 | Weigert | G06F 21/105 |
| | | | 717/131 |
| 2013/0185413 A1 | 7/2013 | Beaty et al. | |

(Continued)

OTHER PUBLICATIONS

PCT Application No. PCT/US2018/044763 International Search Report and Written Report dated Oct. 16, 2018.

*Primary Examiner* — Irete F Ehichioya
*Assistant Examiner* — Antonio J Caiado
(74) *Attorney, Agent, or Firm* — Knobbe, Martens, Olson & Bear, LLP (57) ABSTRACT

Information from a variety of different sources may be used to enrich information about an object retrieved from a computing device/instance associated with a computing network (or web service provider). The additional information from the different sources provides to a user a more comprehensive set of information that may not be easily found (or even available) via sources associated with the computing network. As such, the additional information is beneficial in assisting users in making decisions regarding the purchase, licensing, and use of different objects (e.g. software, hardware, web services) associated with the computing network.

14 Claims, 4 Drawing Sheets

(56) References Cited

U.S. PATENT DOCUMENTS

| | | | |
|---|---|---|---|
| 2013/0326050 A1* | 12/2013 | Halabi | H04L 41/0856 709/224 |
| 2014/0279201 A1* | 9/2014 | Iyoob | G06Q 30/0631 705/26.7 |
| 2015/0188927 A1* | 7/2015 | Santhi | H04L 67/1002 726/4 |
| 2015/0341230 A1* | 11/2015 | Dave | H04L 41/5058 705/7.29 |
| 2016/0065417 A1 | 3/2016 | Sapuram et al. | |
| 2017/0180220 A1* | 6/2017 | Leckey | H04L 41/12 |
| 2018/0367575 A1* | 12/2018 | Narayanaswamy | G06F 16/285 |
| 2019/0220868 A1* | 7/2019 | Ross | G06K 9/6215 |

\* cited by examiner

CLOUD-BASED DISCOVERY AND INVENTORY

CROSS-REFERENCE TO RELATED APPLICATIONS

The present application claims the priority benefit of U.S. provisional application No. 62/539,726 filed Aug. 1, 2017 and entitled "Cloud-Based Discovery and Inventory", the disclosure of which is incorporated herein by reference.

BACKGROUND

Field of Invention

The present invention generally relates to web services. More specifically, the present invention relates to discovery and inventory of objects associated with the cloud.

Description of the Related Art

Web services offer many different types of products that can be purchased and used by individual users on their computing devices. These web services include virtual server instances that provide storage and processing capabilities useful in carrying out different tasks on the cloud. Web services may offer the use of these products on a licensing agreement where the users may be allowed a limited number of uses based on the licenses purchased. Although users may be capable of tracking how many computing devices the products would be installed on associated with the licenses available, there is no easy way to track instances of those products in the cloud. There is a need to easily and efficiently identify these instances when run in the cloud so that users are able to track license compliance.

Furthermore, some web services may have partial information related to their products store in their database. For example, a web service may only provide basic background information about the products being offered to the user. Users may need to refer to third-party sources to obtain more detailed information about that same product. There is a need to provide more comprehensive information about web service products that users would need or would want to view. This would allow users to view what features and requirements are associated with the different types of products offered by each web service and to compare performance and cost between different products.

SUMMARY OF THE CLAIMED INVENTION

A method for cloud-based discovery and inventory is presently claimed. The method for cloud-based discovery and inventory includes receiving a request from a user for information regarding an object associated with the computing device. The computing device is associated with a computing network and has a first set of information about the object. In response to the request from the user, instructions are generated for an agent that retrieves a second set of information about the object stored within the computing device. A proprietary server identifies a third set of information about the object that is not included within the first and second set of information. This third set of information is stored within a database. The proprietary server then enriches the first and second set of information using the third set of information in order to provide the user with a comprehensive set of information about the object that the user is able to use responsive to the user request. The comprehensive set of information is displayed, via a user interface, for the user to view.

A system for cloud-based discovery and inventory is presently claimed. The system includes a plurality of computing devices associated with a computing network that includes a first set of information about objects that are associated with the computing devices. Each of the computing devices includes an agent that can be used to retrieve a second set of information about the object associated with the computing devices. A database includes a third set of information about the objects that are distinct from the first and second set of information. When a user request for information about an object associated with the computing device is received at a server, instructions for the agent are generated by the server in order to retrieve the second set of information specific to the user request. The first and second set of information is subsequently combined with a third set of information that is distinct from the first and second set by the server so as to provide a comprehensive set of information about the object that is responsive to the user request regarding the object. The comprehensive set of information is displayed for the user to view via a user interface.

A non-transitory computer-readable storage medium having embodied thereon a program executable by a processor to perform a method for cloud-based discovery and inventory includes receiving a request from a user for information regarding an object associated with the computing device. The computing device is associated with a computing network and has a first set of information about the object. In response to the request from the user, instructions are generated for an agent that retrieves a second set of information about the object stored within the computing device. A proprietary server identifies a third set of information about the object that is not included within the first and second set of information. This third set of information is stored within a database. The proprietary server then enriches the first and second set of information using the third set of information in order to provide the user with a comprehensive set of information about the object that the user is able to use responsive to the user request. The comprehensive set of information is displayed, via a user interface, for the user to view.

DETAILED DESCRIPTION

The present disclosure uses information stored within proprietary databases (e.g. BDNA database) to enrich and provide a more comprehensive set of information about a web service product (e.g. web service) that users would view by enriching the information that is available with information from other sources (e.g. third party sources, proprietary database). Typically, relevant information for an object (e.g. web service product) may not be easily displayed (or available) for the user to view. The user may need to search through multiple different windows, menus, or sources for the related information. Even with the searching, the user may still not find the desired information that is relevant to object nor may not be able to confirm accuracy of the information found. There is a need for a process that provides enriched information to the user via the proprietary database that adds to information that is coming from the web server and/or user.

Furthermore, the proprietary databases (e.g. BDNA database) can be used to ensure that users are compliant to licensing use of different web service products (e.g. software applications) when used within the cloud. As noted above, software licenses govern a number of instances that a user may use that product. Generally, this can be tracked by the number of times the user installed that same product on different computing devices. For example, a company having one hundred licenses for software A would be allowed to have one hundred different computing devices have that software installed. However, with the use of the cloud, many more instances of that same software can be run. It may be possible that from those one hundred different computing devices, many more instances of the application may be run on the cloud. The present invention describes a process that allows users to track these instances that are operating in the cloud in order to monitor licensing compliance.

As used herein, the proprietary database (i.e. BDNA database) is a database that stores information about a variety of different objects. The proprietary database may be run on one or more computing devices (e.g. servers), implemented via the cloud, or as a combination of the two.

The information stored within the proprietary database may be used to uniquely identify the presence of an object (e.g. software application) stored on a computing device. For example, certain applications may have a unique set of characteristics. If these characteristics are found within the computing device, it can be inferred that the application exists on that computing device.

The proprietary database also includes cloud-based information about each application used to identify instances of that application running on the cloud. Such cloud-based information such as internet protocol (IP) address and instance identification (ID) would be collected from each computing device. The cloud-based information can then be used in connection with third-party sources that monitor the instances run on the cloud in order to connect the instances with the appropriate application stored on a computing device. The proprietary database may also include additional information about an object (e.g. application) that can be displayed for the user to view. The database itself includes information about many different types of objects.

As used herein, an object refers to either the software application stored on the computing device or the associated instance of that software application run on the cloud. Information about these objects is stored within the proprietary database. Such information include the uniquely identifiable characteristics that can be used to identify the presence of the object stored on the computing device or run on the cloud. Furthermore, additional information associated with these objects may also be stored within the proprietary database used for enrichment (e.g. features, requirements, restrictions, and capabilities).

Many companies may offer products (e.g. cloud-based instances) that a user can pay for via licenses for in order to utilize. For example, AMAZON provides virtual server hosting via different elastic compute cloud (EC2) instance types. AMAZON's website includes the different types of instance types as well as the cost for using it. The large variety of instance types allow for the user to select a type to use based on the individual needs of the user. However, presently two issues are present in that: 1) it is not easy to compare and contrast which web service should be chosen to best suit the user's with respect to cost, and 2) additional information about each instance type such as features, restrictions, and requirements for use may not be prominently displayed, may not be easily accessible or in some cases be unavailable via the AMAZON web service.

Companies may not be in the practice of providing cost analysis for the user and would thus not have the capabilities of providing information useful to the user to perform such analysis. For example, AMAZON may not monitor or provide information (e.g. total up-time) that would allow the user to compare usage of two or more different instance types. This would prevent the user who may wish to learn how much it would cost to use a different virtual server type B from a first virtual server type A over a same period of time. This information would be helpful in order to decide which server type would be more cost effective and therefore influence licensing decisions.

Companies also offer many different products (e.g. software applications) that can be licensed on a per use basis. For example, a user may be able to purchase a number of licenses for a software application that can be then used on the same number of computing devices. However, with the use of the cloud, the number of instances of that same software application is no longer limited to the number of computing devices that the application is installed on. With the use of virtual machines, the software application can have many more instances (more than the allotted purchased license) run on the cloud. As noted above, since companies may not be in the practice of providing cost analysis regarding the software application for the user nor provide tools to track whether the user is compliant with the purchased license, there would be no easy way for the user to monitor and track how many instances of the software application have been run to ensure licensing compliance.

For example, ORACLE may allow a user to purchase a number of licenses that would allow that user limited use of their products. The user may be able to track the number of computing devices that the corresponding product is installed on. However, an issue arises when those products are used in connection with the cloud via cloud-based instances. It is not possible to track and monitor cloud-based use of the product for purposes of licensing compliance.

The present invention aims to 1) identify objects (e.g. the software applications and the instances of the applications run on the cloud), 2) process the information about the identified objects, 3) incorporate additional information about the identified object from proprietary databases, and 4) display an enriched set of information regarding the identified object for the user to view. In this way, the enriched information provided about the object can be utilized by the user to make a more informed decision (e.g. licensing) about corresponding objects such as cost and license compliance.

Figure 1:
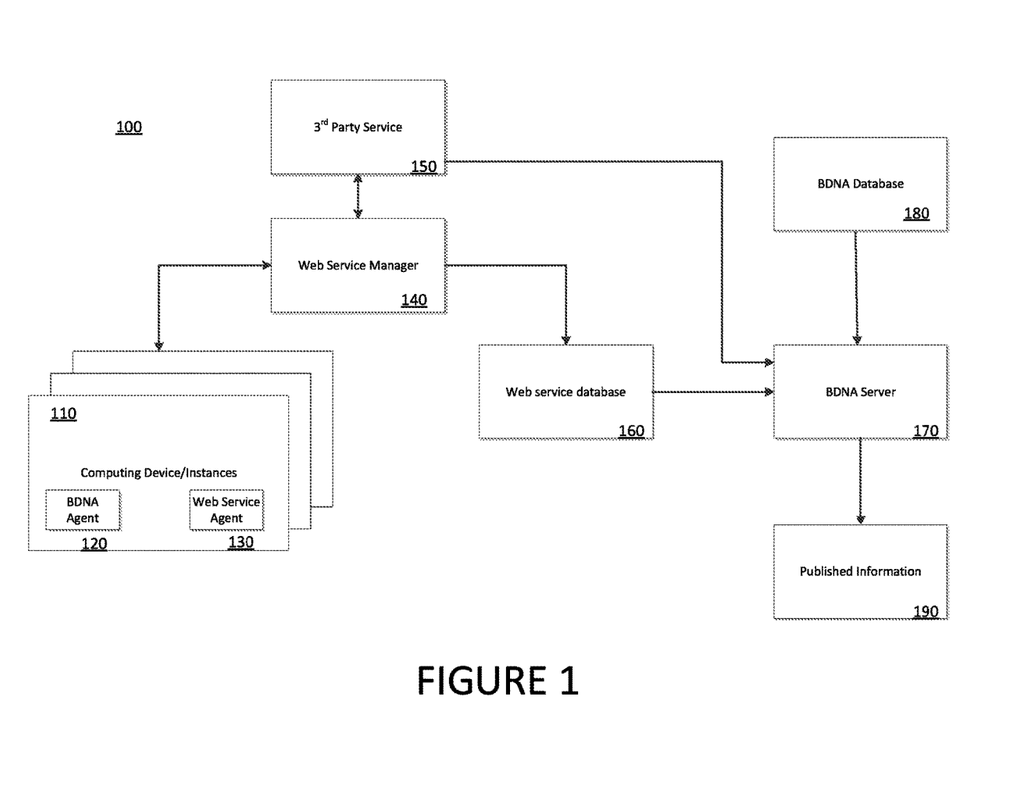
FIG. 1 illustrates a system for cloud-based discovery and inventory.

FIG. 1 illustrates a system 100 for cloud-based discovery and inventory. The system 100 provides enriched information that a user can view regarding different objects (e.g. software application, instances of the software application) associated with the computing devices or computing instances 110 are using. The enriched information may include information about the objects that 1) is not easily found via sources associated with the web service, 2) not prominently displayed via sources associated with the web service, and/or 3) unavailable via sources associated with the web service. An example source associated with the web service may include a website pertaining to the object. The website may have a plurality of different menus, windows, or webpages that each includes different information about the object. It may not be easy for the user to figure out where specific information is stored on the website. Furthermore, some information may not be available on the website. Such information, for example, how to identify which computing devices have the object installed or which instances on the cloud correspond to that installed object, are specific information that only the proprietary database 180 has available.

The users can rely on the enriched information provided by the system 100 (via the proprietary database 180) in order to evaluate, for example, cost and licensing compliance and alternatives in relation to the objects currently associated with the computing device or computing instance 110 where some or all of the information needed to make such evaluation may be 1) found on different webpages than what is currently being viewed by the user or 2) not available with the website. Further details regarding each of the elements of FIG. 1 will be provided below.

The system 100 for cloud-based discovery and inventory can be associated with a computer network or web service. This computer network or web service may be implemented in the cloud. This computer network or web service may be associated with a company (e.g. AMAZON, MICROSOFT) that offers products (e.g. software application) for use by a user.

As illustrated in the figure, the computer network or web service (e.g. AMAZON) includes a web service manager 140 that can be used to manage communication between the computer network or web service (e.g. AMAZON) and the computing device/computing instances 110 associated with the user. When a situation arises where the user (via the proprietary server 170) requests additional information about one or more different objects associated with the computing device/computing instances 110, the web service manager 140 will instruct the corresponding computing device/computing instance 110 to collect information about the user identified object. For example, such request may include licensing compliance or cost comparison of different object use within the cloud.

The request for additional information coming from the user would be based on information that is not available with the computer network or web service (e.g. AMAZON). In particular, the computer network or web service would not include information that can be used to identify which instances run on the cloud correspond to which applications stored at the associated computing device. The computing network or web service may have a list of known information that it possesses on the website or associated with a particular web page regarding the object. Any information that the user requests that is not on that list may be used to trigger a request for additional information from the proprietary server 170/proprietary database 180.

The instructions regarding the user request received at the proprietary server 170 can be provided by the web service manager 140 to the corresponding computing device/computing instance 110. The web service manager 140 communicates via associated web service agents 130 that are installed on each computing device 110. The web service agent 130 receives instructions regarding retrieval of information about a particular user selected object from the web service manager 140. Upon receiving the instructions from the web service manager 140, the instructions are executed by the web service agent 130. The executed instructions may include having the web server agent 130 instruct a proprietary agent (e.g. BDNA agent) 120 to begin collecting and transmitting information about the object to the web service manager.

The proprietary agent 120 is similarly installed on the computing device 110 or at least associated with the computing instance 110 similar to the web service agent 130. However, the proprietary agent 120 is used to retrieve relevant information about a particular object (e.g. software application, instance information for the software application) associated with the computing device/computing instance 110. The proprietary agent 120 may run a number of different scripts designed to collect different types of information about the user selected objects associated with the computing device/computing instance 110. For example, one category of scripts may be used to collect information from the operating system of the computing device 110. Another category of scripts may be used to search for and collect information from characteristics associated with objects that may be found on the computing device 110. Another category of scripts may be used to search for and collect cloud-based information (e.g. IP address, instance information) for those objects.

As used herein, scripts refer to a list of rules that are executed by the proprietary agent 120 that are used to identify and collect specific information (e.g. characteristics or features of interest) regarding a particular object from the computing device/instance 110. Example information collected about the objects using the scripts associated with the proprietary agent 120 may include information that can be used to uniquely identify the object as well as additional information associated with the object such as compatible operating system name, manufacturer, version, build number, and service pack.

The scripts used by the proprietary agent 120 may be stored within the proprietary agent 120. These scripts may already be stored within the agent 120. In some situations, the proprietary agent 120 may download the necessary scripts from an external source. In some embodiments, the proprietary agent 120 may use the scripts directly from the external source. The scripts that are used by the proprietary agent 120 can also be updated with new and/or modified scripts as needed as new or updated objects are implemented by the web service.

The information retrieved from the computing device/instance 110 via the proprietary agent 120 can be stored in a database 160 associated with the web service. The web service database 160 may similarly be situated in the cloud much like the computing network/web service described above. The web service database 160 may include a component that allows for storage of object-related information retrieved from the computing device 110. Furthermore, the web service database may include an interface that facilitates access to the stored information within the web service database 160. The web service database 160 may also include information that is known or possessed by the computing network or web service about the object. For example, a company may know the underlying cost of an object, requirements and capabilities and have that information somewhere on one of the sources (e.g. web page) associated with the web service.

The information that is stored within the web service database 160 is kept within the database 160 until it is retrieved, for example, by a proprietary server 170 that would be used to process the information retrieved from the computing device 110. When the proprietary server 170 is informed that information is currently available for processing within the web service database 160, the proprietary server 170 can retrieve the information to be processed when ready. The proprietary server 170 would utilize the interface associated with the web service database 160 to retrieve information about the object. The information stored in the web service database 160 can then be deleted. For example, once information from the web service database 160 has been retrieved and processed by the proprietary server 170, such information can be removed to make room for data in the future. Alternatively, the web service database 160 can be maintained by having stored information within the web service database removed after not being used for a predetermined period of time.

It should be noted that in some embodiments, information from the proprietary database can be provided directly to the proprietary server 170 (not shown).

The processing performed by the proprietary server 170 includes 1) identifying the particular object the collected information pertains to, 2) identifying missing information associated with the object that should be included for the user to view, 3) retrieving the missing information from the proprietary database 180, and 4) enriching the information about the object with information from the proprietary database 180.

With respect to 1), fingerprints are used to identify and confirm which object the information retrieved from the web service database 160 pertains to. As used herein, fingerprints refer to a collection of characteristics about an object that can be used to uniquely identify the object. The proprietary server 170 is able to process the information from the web service database 160 in order to identify the unique characteristics associated with the object used by fingerprints to identify what object the information pertains to. Cloud-based fingerprints (via use of cloud-based information0 are able to uniquely identify and associate instance information associated with each object found on the computing device 110.

The proprietary database 180 can be used to store all the possible fingerprints that the proprietary server 170 can use to identify objects (and the instances associated with those objects) pertaining to the computing device 110. The proprietary database 180 can be implemented in the cloud, via one or more computing devices (e.g. server) or a combination of the two.

The proprietary database 180 can also be used to store object license information associated with the computing devices 110. The proprietary database 180 would include license information associated with the corresponding object so that the proprietary server 170 is able to later determine information regarding licensing compliance for the user. With the example above regarding the ORACLE license, the proprietary database 180 can be used to store information for each user a license agreement for an object as well as information that can be used to identify the object when installed on a computing device as well as instances of that object when run on the cloud. With this group of information, the proprietary server 170 can then identify and determine how many uses (via installed computing devices and cloud-based instances) of that license have been consumed and whether the uses are in compliance with the corresponding license (e.g. used no more than the allotted licensed amount).

Associated with each fingerprint within the proprietary database 180 would be entries that include all related information about the object as well for use during enrichment. The enrichment information stored within the proprietary database 180 contains any and every type of useful information obtained from various different sources that may not be available on the user computing device 110 and/or the computing network. Some example information regarding the objects stored in the computing devices 110 but available on the computing network may include operational requirements and end-of-life information for the object. Some information (such as cloud-based information pertaining to IP address, instance ID) may be unique to the computing device and not available at the computing network.

The different types of information described above are compiled from various different sources (e.g. sources associated with the web service, user computing device 110, third party sources) and stored within the proprietary database 180. The information associated with the proprietary database 180 can be updated on a regular basis or whenever new information is found/received. By using the proprietary database 180, information that may not be available at a particular web service source (e.g. web site) associated with the object would be made available to the user to view via the system 100.

In some situations, there may be a need to use other information not available via the computing device 110 or the computing network. In some situations, this information may not be tracked by the computing device 110 or the computing network. Therefore, the information would need to be obtained from third party services 150.

Example information obtained from third party services 150 may include monitoring information of objects within the cloud from a monitoring solution. With respect to the example above regarding the virtual server instances, the third party service 150 can be used to monitor a state of each virtual server instance (e.g. new, running, stopped, terminated) associated with the computing device 110 at any given time. The virtual instances may correspond to applications installed on a computing device 110 but run on the cloud. The third party service 150 can be used to identify a total uptime for the instances over a period of time. Once obtained, the information from the third party services 150 is provided to the proprietary server 170 for use, for example, in determining licensing compliance or licensing alternatives.

The computing device 110 and/or the computing network may not have the capability nor resources for tracking and maintaining records of all instances associated with use of the object on the cloud. The information obtained from third party services 150 may be helpful for the user in monitoring licensing compliance and licensing alternatives (e.g. calculating cost for using a particular virtual server instance type and comparing cost with other virtual server instance types alongside the cost information available via the web service and/or proprietary database 180). Other third party sources 150 may also be implemented (aside from the monitoring solution described) in order to provide additional information associated with the cloud-based use of the objects.

Once the additional information from the proprietary database 180 (and/or third party sources 150) has been received and processed alongside the information from the web service database 160 via the proprietary server 170, the enriched information can then be presented/published to the user 190. The enriched information can be presented/published using a particular interface associated with the proprietary server 170. The enriched information includes, for example, associations between the objects stored within the computing devices 110 and the instances of the objects run on the cloud. The enriched information also includes, for example, cost comparisons of running different instances on the cloud.

In applying the above system 100 to the examples regarding the virtual server instances, the system 100 would be able to provide the user with information that would allow for the user to understand cost associated with using one instance type over another. Information about a particular instance type currently run on the computing device/computing instance 110 would be enriched with additional information from other sources (e.g. $3^{rd}$ party service 150 and/or proprietary database 180). In this way, the user could also obtain additional information about requirements or other features associated with an instance type that could influence the user's decision to select one instance over another that are unavailable from the web service.

Furthermore, the system 100 would also be able to provide the user with information that would allow the user to monitor and track instances associated with the objects for licensing compliance. Information regarding instances obtained from third party services would be enriched with the additional information from the proprietary database 180 so that users are able to identify the instances that have been run (or are running) in the cloud associated with the licensed objects on the computing devices 110.

Figure 2:
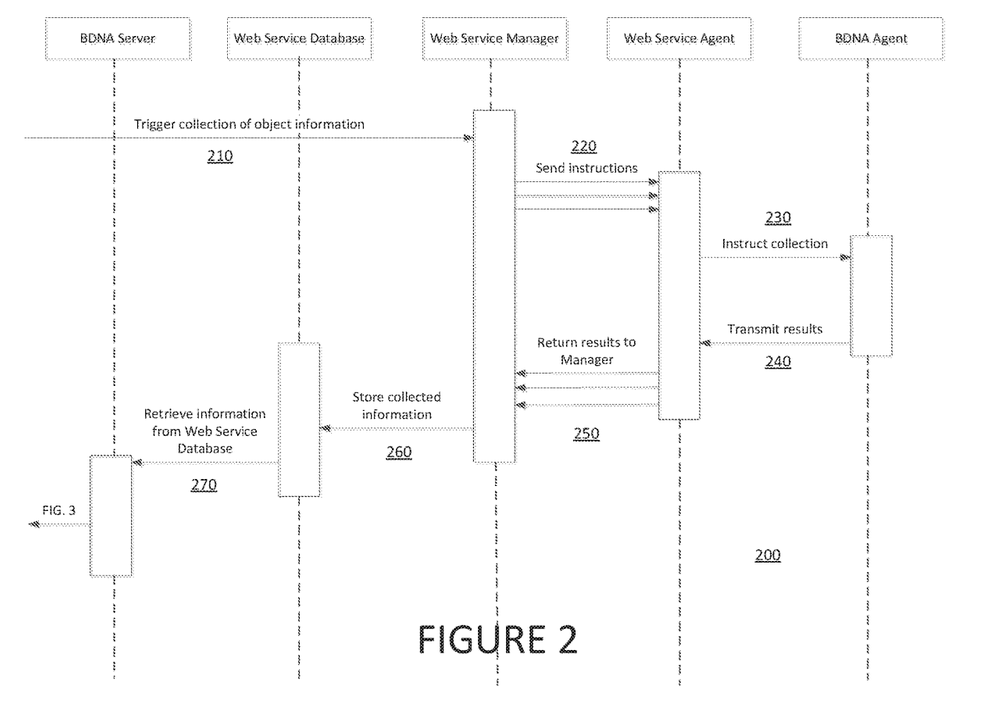
FIG. 2 illustrates a flowchart of communications for implementing discovery via the system of FIG. 1.

FIG. 2 illustrates a flowchart 200 of communications for implementing discovery via the system of FIG. 1. In particular, the figure illustrates the different components of the system directed at 1) discovering and retrieving information about objects (and instances of those objects) associated with the computing devices, 2) storing the information about the discovered objects into the web service database, and 3) retrieving information from the web service database by the proprietary server for enrichment.

In step 210, information about an object to be collected is requested. The request may be triggered, for example, based on a user request for additional information about the object that is not currently available on a source associated with the computer network or web service (e.g. website). For example, cloud-based information for the object associated with the computing device can be obtained. Furthermore, information specific to the object that the computer network or web service possesses may also be obtained. The proprietary server may receive the user request for information and provide instructions to obtain the information from the computing device and/or the computing network.

In step 220, the computing network or web service acknowledges the request for object information coming from the proprietary server. The computing network/web service provides instructions to corresponding computing devices/computing instances associated with the user to retrieve the requested information about the object. The instructions can be specifically targeted to the computing devices/computing instances belonging to the user via transmission of the instructions to corresponding web service agents. Each web service agent may be uniquely identified and associated with user. The correspondence between a web service agent and a user may be stored in memory and referenced by the web service manager when being instructed to retrieve information for a particular user.

In step 230, the web service agent acknowledges the instructions from the web service manager to retrieve information about an object. However, the web service agent would not know what information to retrieve nor which information pertains to which object. Therefore, the web service agent communicates with the proprietary agent that is designed to identify the specific information associated with the object corresponding to the computing device/instance. The proprietary agent is capable of identifying object specific information associated with the user request through the use of fingerprints.

In step 240, once the proprietary agent locates the information related to the object, the proprietary agent transmits the information back to the web service agent. The web service agent then transmits the information back to the web service manager in step 250. In situations where the web service manager is receiving information from a plurality of different computing devices/instances simultaneously based on the same user request, the web service manager may tag each group of information according to where the information was obtained from.

In step 260, the information that is transmitted from the computing devices/instances to the web service manager can subsequently be stored in a corresponding web service database. The web service database may act as a temporary storage for the information until the proprietary server proceeds with retrieving and processing the information contained therein. Furthermore, information that the computing network/web service has regarding the corresponding object may also be stored alongside the information from the computing devices/instances.

In step 270, information about the object may be retrieved from the web service database by the proprietary server. In one embodiment, the information may be pulled from the web service database by the proprietary server predetermined periods of time. The information may also be pulled upon request. Furthermore, when data is stored in the web service database, the proprietary server may be notified that such data corresponding to the user request have become available. A separate process may be present that schedules (via a queue) how the information stored within the web service database may then be processed (via the proprietary server as discussed in the following figure).

There may be situations where the system of FIG. 1 has multiple proprietary servers all capable of enriching the data coming from the web service database. The process that schedules how the information stored within the web service database should be processed can also schedule when each set of information will be processed as well as which proprietary server will perform the enrichment. This may allow load distribution across multiple different proprietary servers so some proprietary servers do not become overburdened while others still have resources available to perform enrichment of data.

Figure 3:
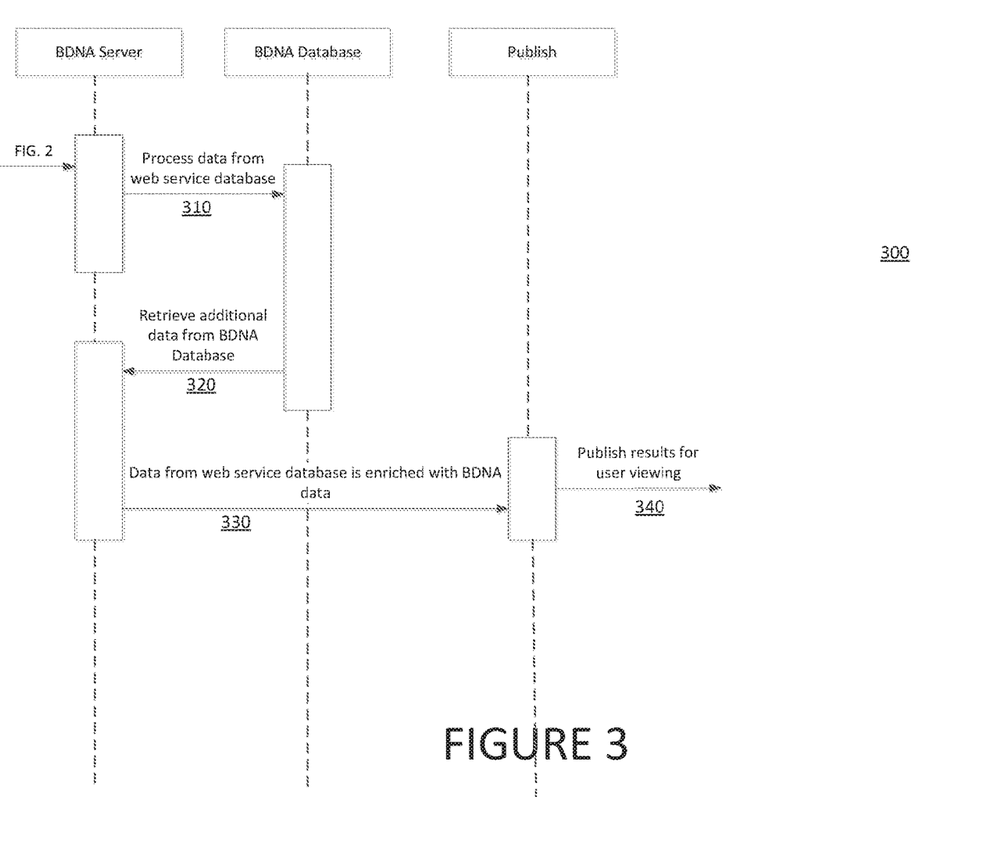
FIG. 3 illustrates a flow chart of communications for implementing data enrichment via the system of FIG. 1.

Flow chart of FIG. 2 illustrates a first portion of the discovery and inventory features of the present invention pertaining to the retrieval of information from the computing devices/instances in response to a user request. FIG. 3 (described below) will illustrate the second portion of the discovery and inventory features of the present invention pertaining to the enrichment of the information from the computing devices/instances using information from additional sources (e.g. third party sources, proprietary database).

FIG. 3 illustrates a flow chart 300 of communications for implementing cloud-based inventory via the system of FIG. 1. In particular, the figure continues the flowchart from FIG. 2 with the proprietary server interactions directed at enriching the information that will be displayed for the user to view.

In step 310 the proprietary server begins processing the data retrieved from the web server database (from step 270 of FIG. 2). The processing performed in step 310 includes 1) identifying or confirming the information being associated with a particular object, and 2) identifying what additional information is needed from the proprietary database in order to provide a comprehensive set of information for the user to view.

In step 320, the additional information is retrieved from the proprietary database. The proprietary server communicates with the proprietary database using the identification of the object (via fingerprinting) in order to find the corresponding entry for the object within the proprietary server. For example, each object has a unique combination of characteristics that can be used to uniquely identify the object. Identification of these characteristics within the data that is retrieved from the web service database can be used to uniquely identify which object the data corresponds to that is installed on the computing device. Presuming that the entry already exists within the proprietary server, the additional information (corresponding to what information is missing from step 310) is retrieved from the proprietary database. The additional information obtained from the proprietary database in step 320 can also be used to associate instance information obtained from third party sources (e.g. monitoring solutions) to identify which instances of the object correspond to the computing device.

If the entry for the object within the proprietary server does not exist or if an existing entry is not up to date, the proprietary database may generate instructions directed at updating and obtaining the necessary information for the proprietary database. For example, if cloud-based information for the object associated with the computing device are not available, the proprietary server may request such information from the computing device to be obtained (for example, via the proprietary agent). Once the information within the proprietary database has been obtained and/or updated properly, the proprietary server can be provided the necessary information that is missing (as identified in step 320).

In step 330, the additional information provided from the proprietary database is combined with the data from the web service database. The proprietary server incorporates the additional information in order to enrich the information originally available. In some situations, additional information may also be incorporated from third party sources (e.g. monitoring solutions) that could provide cloud-based information specific to the instances associated with the object of the user request. In any case, the incorporation of all the data from these various sources allows for a more comprehensive view of data associated with the object that can then be used by the user, for example, for licensing cost comparisons or licensing compliance determination.

During the enriching of the data using the additional data from the proprietary database, the information retrieved from the web service database may be "cleaned." Cleaning as used herein may involve mapping, converting, or translating the information from a first state associated with the user computing device and/or computing network into a second state that is allows for the information from the web service database to be compatible with the information associated with the proprietary database.

In step 340, the enriched data is published for the user to view in response to the user request. The enriched data is displayed via user interface associated with the proprietary server. The enriched data provides comprehensive data that can be used by the user to make an informed decision, for example, regarding which product to use in situations where the web service offers multiple products (e.g. virtual server instances) or to determine whether use of the object (via cloud-based instances) comply with existing purchased licenses. In general, the enriched data aims to provide more information in a more efficient manner that users would not be able to find easily (or in some cases at all) if the users just relied on the data provided by sources associated with the web service or object.

Figure 4:
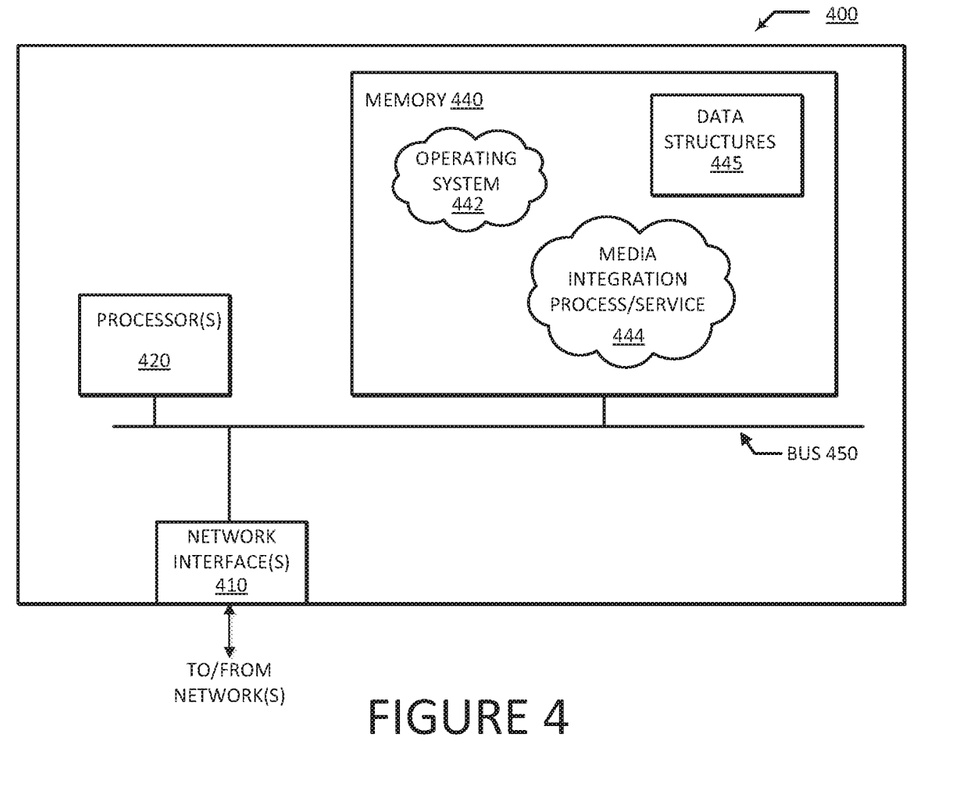
FIG. 4 illustrates an exemplary computing device that may be used to implement an embodiment of the present invention.

FIG. 4 illustrates an exemplary computing device 400 (e.g. proprietary server) that may be used to implement an embodiment of the cloud-based discovery and inventory invention described herein. As shown, in the figure, the computing device 400 includes one or more network interfaces 410 (e.g., transceivers, antennae, etc.), at least one processor 420, and a memory 440 interconnected by a system bus 450.

Network interface(s) 410 contain the mechanical, electrical, and signaling circuitry for communicating data over links coupled to one or more networks. Network interfaces 410 are configured to transmit and/or receive data using a variety of different communication protocols, as will be understood by those skilled in the art. For example, the network interfaces 410 can be used to communicate with the web service manager to 1) provide user request for information about a particular object, and 2) receive notification associated with information currently stored within the web service database, 3) receive information stored within the web service database, 4) receive information from third party sources, and 5) receive information from the proprietary database.

Memory 440 comprises a plurality of storage locations that are addressable by processor 420 for storing software programs and data structures associated with the embodiments described herein. For example, memory 440 can include a tangible (non-transitory) computer-readable medium, as is appreciated by those skilled in the art. Example programs may include those that facilitate in the creation of the generated vouchers that are provided to the ad servers. Other programs may facilitate the communication of information between the ad server and the wallet store.

Processor 420 may comprise necessary components, elements, or logic adapted to execute the software programs and manipulate data structures 445, which are stored in memory 440. An operating system 442, whereby portions of which are typically resident in memory 440 and is executed by processor 420, can be used to functionally organize the device 400 by invoking operations in support of software processes and/or services executing on the device 400. These software processes and/or services may comprise an illustrative "media integration" process/service 444 that allows for the communication of the information coming from various different sources (e.g. web service database, third party source, proprietary database) into the proprietary server. Note that while process/service 444 is shown in centralized memory 440, the process/service 444 may be configured to operate in a distributed communication network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 420 can include one or more programmable processors, e.g., microprocessors or microcontrollers, or fixed-logic processors. In the case of a programmable processor, any associated memory, e.g., memory 440, may be any type of tangible processor readable memory, e.g., random access, read-only, etc., that is encoded with or stores instructions that can implement program modules, e.g., a module having spectator channel process 444 encoded thereon. Processor 420 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for cloud-based discovery and inventory comprising:
    receiving a request from a user via a requesting device for information regarding cloud-based information of an object, the cloud-based information indicative of, at least, licensing compliance information associated with the object, wherein the object is associated with an application of a plurality of applications available for execution via a cloud-based web service, and wherein one or more computing devices associated with the user are configured to store the application and communicate with respective instances of the application executing via the cloud-based web service;
    identifying that the requested cloud-based information regarding the object is not stored on the requesting device;
    generating instructions for respective agents associated with the one or more computing devices, the generated instructions directing the one or more agents to retrieve the requested cloud-based information about the object from one or more third-party sources, wherein the one or more third-party sources collect cloud-based information about objects;
    identifying that the requested cloud-based information about the object is stored at the one or more third-party sources by using a fingerprint of the object to match cloud-based information about the object stored at the one or more third-party sources, wherein the fingerprint comprises characteristics about the object usable to uniquely identify one or more instances of the associated application;
    enriching information stored on the requesting device about the object with the requested cloud-based information about the object stored at the one or more third-party sources, the enriching including:
        retrieving the requested cloud-based information about the object, and
        incorporating the requested cloud-based information with the information about the object stored on the requesting device to create a comprehensive set of information about the object that is responsive to the user request; and
    displaying the comprehensive set of information about the object for the user to view in response to the user request via a user interface, wherein the comprehensive set of information reflects, at least, associations between the application stored on the one or more computing devices and associated instances of the application and tracking information that tracks usage of the object associated with the one or more computing devices.

2. The method of claim 1, wherein the computing network is associated with the cloud-based web service provider.

3. The method of claim 1, wherein each agent is specific to the computing network.

4. The method of claim 1, wherein a first third party source of the one or more third party sources is a monitoring solution and a second third party source of the one or more third party sources includes the tracking information.

5. The method of claim 4, wherein the tracked usage of the object includes tracking a total uptime of object use over a period of time.

6. The method of claim 1, wherein identifying that the requested cloud-based information regarding the object is not stored on the requesting device is performed using a plurality of scripts, wherein each of the scripts of the plurality of scripts collects a specific piece of information about the object from the requesting device.

7. The method of claim 1, wherein the cloud-based information about the object stored at the one or more third-party sources is compiled from a plurality of different sources.

8. The method of claim 7, wherein the cloud-based information about the object at the one or more third-party sources is updatable.

9. The method of claim 1, wherein information about the object stored on the device is displayed on web page viewable by the user.

10. The method of claim 1, wherein the enriching also includes formatting the cloud-based information retrieved from the one or more third-party sources so the cloud-based information is compatible with the information stored at the requesting device.

11. A system for cloud-based discovery and inventory comprising:
    a plurality of computing devices associated with a computing network, wherein each computing device includes an agent that is used to retrieve information about an object configured for storage on the computing device,
    wherein the object is associated with an application of a plurality of applications available for execution via a cloud-based web service, and wherein the computing devices are configured to communicate with respective instances of the application executing via the cloud-based web service;

one or more third-party sources that collect cloud-based information about objects; and a processor that includes instructions stored in memory, the instructions executed by the processor to:

receive a request from a user of a requesting device for information regarding cloud-based information of the object, identify that the requested cloud-based information regarding the object is not stored on the requesting device, generates instructions for the agents associated with the computing devices that directs the agents to retrieve the requested cloud-based information about the object from the one or more third-party sources, identify that the requested cloud-based information about the object is stored at the one or more third-party sources by using a fingerprint of the object to match cloud-based information about the object stored at the one or more third-party sources, wherein the fingerprint comprises characteristics about the object usable to uniquely identify one or more instances of the associated application, enrich information stored on the requesting device about the object with the requested cloud-based information about the object stored at the one or more third-party sources, wherein the enriching includes:

retrieving the requested cloud-based information about the object, and incorporating the requested cloud-based information with the information about the object stored on the requesting device to create a comprehensive set of information about the object that is responsive to the user request, and display the comprehensive set of information about the object for the user to view in response to the user request via a user interface, wherein the comprehensive set of information reflects, at least, associations between the application configured for storage on the computing devices and associated instances of the application and tracking information that tracks usage of the object associated with the one or more computing devices.

12. The system of claim 11, wherein a first third party source of the one or more third party sources is a monitoring solution and a second third party source of the one or more second third party sources includes the tracking information.

13. A non-transitory computer-readable storage medium, having embodied thereon a program executable by a processor to perform a method for cloud-based discovery and inventory comprising:

receiving a request from a user via a requesting device for information regarding cloud-based information of an object, the cloud-based information indicative of, at least, licensing compliance information associated with the object, wherein the object is associated with an application of a plurality of applications available for execution via a cloud-based web service, and wherein one or more computing devices associated with the user are configured to store the application and communicate with respective instances of the application executing via the cloud-based web service;

identifying that the requested cloud-based information regarding the object is not stored on the requesting device;

generating instructions for respective agents associated with the one or more computing devices, the generated instructions directing the one or more agents to retrieve the requested cloud-based information about the object from one or more third-party sources, wherein the one or more third-party sources collect cloud-based information about objects;

identifying that the requested cloud-based information about the object is stored at the one or more third-party sources by using a fingerprint of the object to match cloud-based information about the object stored at the one or more third-party sources, wherein the fingerprint comprises characteristics about the object usable to uniquely identify one or more instances of the associated application;

enriching information stored on the requesting device about the object with the requested cloud-based information about the object stored at the one or more third-party sources, the enriching including:

retrieving the requested cloud-based information about the object, and incorporating the requested cloud-based information with the information about the object stored on the requesting device to create a comprehensive set of information about the object that is responsive to the user request; and displaying the comprehensive set of information about the object for the user to view in response to the user request via a user interface, wherein the comprehensive set of information reflects, at least, associations between the application stored on the one or more computing devices and associated instances of the application and tracking information that tracks usage of the object associated with the one or more computing devices.

14. The non-transitory computer-readable storage medium of claim 13, wherein a first third party source of the one or more third party sources is a monitoring solution and a second third party source of the one or more second third party sources includes the tracking information.

* * * * *